(12) United States Patent
Kim et al.

(10) Patent No.: US 9,365,671 B2
(45) Date of Patent: Jun. 14, 2016

(54) STYRENE-BASED COPOLYMER AND THERMOPLASTIC RESIN COMPOSITION INCLUDING THE SAME

(71) Applicant: Samsung SDI Co., Ltd., Yongin-si (KR)

(72) Inventors: Bo Eun Kim, Uiwang-si (KR); Joo Hyun Jang, Uiwang-si (KR); Jae Won Heo, Uiwang-si (KR); Kwang Soo Park, Uiwang-si (KR); Natarajan Senthilkumar, Uiwang-si (KR); Il Jin Kim, Uiwang-si (KR); Jun Sung Oh, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/557,478

(22) Filed: Dec. 2, 2014

(65) Prior Publication Data
US 2015/0152205 A1 Jun. 4, 2015

(30) Foreign Application Priority Data

Dec. 4, 2013 (KR) .................. 10-2013-0149586
Jun. 26, 2014 (KR) .................. 10-2014-0079092

(51) Int. Cl.
| | | |
|---|---|---|
| C08L 25/08 | (2006.01) | |
| C08F 230/08 | (2006.01) | |
| C08F 212/10 | (2006.01) | |
| C08L 33/20 | (2006.01) | |
| C08L 25/12 | (2006.01) | |
| C08L 33/18 | (2006.01) | |

(52) U.S. Cl.
CPC ............. *C08F 230/08* (2013.01); *C08F 212/10* (2013.01); *C08L 25/08* (2013.01); *C08L 25/12* (2013.01); *C08L 33/18* (2013.01); *C08L 33/20* (2013.01)

(58) Field of Classification Search
None
See application file for complete search history.

(56) References Cited

U.S. PATENT DOCUMENTS

| | | | |
|---|---|---|---|
| 3,322,853 A | | 5/1967 | Trementozzi et al. |
| 3,742,092 A | | 6/1973 | Duke et al. |
| 3,839,513 A | | 10/1974 | Patel |
| 3,898,300 A | * | 8/1975 | Hilliard .................. 525/106 |
| 4,027,073 A | | 5/1977 | Clark |
| 4,045,514 A | | 8/1977 | Iwahashi et al. |
| 4,062,909 A | | 12/1977 | Morgan et al. |
| 4,102,853 A | | 7/1978 | Kawamura et al. |
| 4,117,041 A | | 9/1978 | Guschl |
| 4,287,315 A | | 9/1981 | Meyer et al. |
| 4,303,772 A | | 12/1981 | Novicky |
| 4,391,935 A | | 7/1983 | Bialous et al. |
| 4,400,333 A | | 8/1983 | Neefe |
| 4,460,742 A | | 7/1984 | Kishida et al. |
| 4,632,946 A | | 12/1986 | Muench et al. |
| 4,634,734 A | | 1/1987 | Hambrecht et al. |
| 4,652,614 A | | 3/1987 | Eichenauer et al. |
| 4,659,790 A | | 4/1987 | Shimozato et al. |
| 4,668,737 A | | 5/1987 | Eichenauer et al. |
| 4,692,488 A | | 9/1987 | Kress et al. |
| 4,745,029 A | | 5/1988 | Kambour |
| 4,757,109 A | | 7/1988 | Kishida et al. |
| 4,883,835 A | | 11/1989 | Buysch et al. |
| 4,906,696 A | | 3/1990 | Fischer et al. |
| 4,914,144 A | | 4/1990 | Muehlbach et al. |
| 4,918,159 A | | 4/1990 | Nakamura et al. |
| 4,983,658 A | | 1/1991 | Kress et al. |
| 4,988,748 A | | 1/1991 | Fuhr et al. |
| 4,997,883 A | | 3/1991 | Fischer et al. |
| 5,025,066 A | | 6/1991 | DeRudder |
| 5,061,558 A | | 10/1991 | Fischer et al. |
| 5,061,745 A | | 10/1991 | Wittmann et al. |
| 5,091,470 A | | 2/1992 | Wolsink et al. |
| 5,200,492 A | | 4/1993 | Ohnaga et al. |
| 5,204,394 A | | 4/1993 | Gosens et al. |
| 5,206,404 A | | 4/1993 | Gunkel et al. |
| 5,218,030 A | | 6/1993 | Katayose et al. |
| 5,219,907 A | | 6/1993 | Niessner et al. |
| 5,229,443 A | | 7/1993 | Wroczynski |
| 5,237,004 A | | 8/1993 | Wu et al. |
| 5,239,001 A | | 8/1993 | Fischer et al. |
| 5,274,031 A | | 12/1993 | Eichenauer et al. |
| 5,280,070 A | | 1/1994 | Drzewinski et al. |
| 5,284,916 A | | 2/1994 | Drzewinski |
| 5,292,809 A | | 3/1994 | Drzewinski et al. |
| 5,306,778 A | | 4/1994 | Ishida et al. |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

"Silicones: An Introduction to Their Chemistry and Application" © The Plastics Institute 1962, p. 27.*

(Continued)

*Primary Examiner* — Marc Zimmer
(74) *Attorney, Agent, or Firm* — Additon, Higgins & Pendleton, P.A.

(57) ABSTRACT

Provided are a styrene-based copolymer prepared from a mixture including (A) an aromatic vinyl-based compound, (B) an unsaturated nitrile-based compound, and (C) a silicone-based compound having two or more unsaturated reactive groups to thereby be capable of implementing a uniform and excellent low gloss property with minimal or no deterioration of physical properties such as impact resistance, heat resistance, and the like, and a thermoplastic resin composition including the same.

18 Claims, 3 Drawing Sheets

(56) References Cited

U.S. PATENT DOCUMENTS

| | | |
|---|---|---|
| 5,354,796 A | 10/1994 | Creecy et al. |
| 5,412,036 A | 5/1995 | Traugott et al. |
| 5,446,103 A | 8/1995 | Traugott et al. |
| 5,449,557 A | 9/1995 | Liebler et al. |
| 5,451,650 A | 9/1995 | Siol et al. |
| 5,473,019 A | 12/1995 | Siol et al. |
| 5,475,053 A | 12/1995 | Niessner et al. |
| 5,574,099 A | 11/1996 | Noro et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1 | 8/2002 | Singh et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0097648 A1 | 5/2004 | Nakai et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1 | 11/2005 | Yamanaka et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1 | 4/2006 | Ahn et al. |
| 2006/0100307 A1 | 5/2006 | Uerz et al. |
| 2007/0100073 A1 | 5/2007 | Lee et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168354 A1 | 7/2010 | Hong et al. |
| 2010/0240831 A1 | 9/2010 | Kim et al. |
| 2010/0256288 A1 | 10/2010 | Kim et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160377 A1* | 6/2011 | Chung et al. .............. 524/504 |
| 2011/0160380 A1 | 6/2011 | Kwon et al. |
| 2015/0152205 A1 | 6/2015 | Kim et al. |

FOREIGN PATENT DOCUMENTS

| | | |
|---|---|---|
| CN | 101061179 A | 10/2007 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0721962 A2 | 7/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| GB | 1042783 A1 | 9/1966 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |

(56) References Cited

FOREIGN PATENT DOCUMENTS

| JP | 2006-257284 A | 9/2006 |
|---|---|---|
| JP | 2006-342246 A | 12/2006 |
| JP | 2007-023227 | 2/2007 |
| JP | 2008-292853 A1 | 12/2008 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 648114 B1 | 11/2006 |
| KR | 10-0767428 B1 | 10/2007 |
| KR | 885819 B1 | 12/2007 |
| KR | 2009-0029539 A | 3/2009 |
| KR | 10-902352 | 6/2009 |
| WO | 99 19383 A1 | 4/1999 |
| WO | 99/57198 A1 | 11/1999 |
| WO | 00 00544 A1 | 1/2000 |
| WO | 00 09518 A1 | 2/2000 |
| WO | 00/18844 A1 | 4/2000 |
| WO | 01/66634 A | 9/2001 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A | 10/2009 |

OTHER PUBLICATIONS

European Search Report for commonly owned European Application No. EP 04808586, completed on Sep. 25, 2007.
Chinese Office Action in commonly owned Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 mailed Nov. 7, 2012, pp. 1-3.
Final Office Action in commonly owned U.S. Appl. No. 12/817,302 mailed Feb. 7, 2013, pp. 1-6.
Final Office Action in commonly owned U.S. Appl. No. 12/884,549 mailed Dec. 18, 2012, pp. 1-7.
Notice of Allowance in commonly owned U.S. Appl. No. 12/884,549 mailed Apr. 11, 2013, pp. 1-8.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
Advisory Action in commonly owned U.S. Appl. No. 12/817,302 mailed May 16, 2013, pp. 1-5.
Office Action in commonly owned U.S. Appl. No. 12/898,012 mailed Dec. 21, 2012, pp. 1-6.
Notice of Allowance in commonly owned U.S. Appl. No. 12/972,795 mailed May 24, 2013, pp. 1-8.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.
Advisory Action in commonly owned U.S. Appl. No. 12/961,877 mailed Mar. 12, 2013, pp. 1-2.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
Japanese Office Action in commonly owned Japanese Application No. 2010-539284, dated Sep. 11, 2012, pp. 1-3.
Office Action in commonly owned U.S. Appl. No. 12/631,018 mailed Apr. 26, 2012, pp. 1-12.
Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
Office Action in commonly owned U.S. Appl. No. 12/817,302 mailed Mar. 29, 2012, pp. 1-5.
Office Action in commonly owned U.S. Appl. No. 12/884,549 mailed Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 mailed Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27.
Office Action in commonly owned U.S. Appl. No. 12/880,209 mailed Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007157, dated May 28, 2009.

(56) References Cited

OTHER PUBLICATIONS

Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
European Search Report in commonly owned European Application No. 08873425.6 dated May 29, 2012, pp. 1-5.
Office Action in commonly owned U.S. Appl. No. 12/792,176 mailed Nov. 16, 2011, pp. 1-12.
Notice of Allowance in commonly owned U.S. Appl. No. 12/880,209 mailed Oct. 10, 2013, pp. 1-10.
Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 mailed Jul. 30, 2012, pp. 1-14.
Search Report in counterpart European Application No. 14194463.7 dated Apr. 23, 2015, pp. 1-2.
Paris et al. "Glass Transition Temperature of Allyl Methacrylate-n-Butyl Acrylate Gradient Copolymers in Dependence on Chemical Composition and Molecular Weight", Journal of Polymer Science Part A, pp. 1845-1855.
Wunderlich, "Thermal Analysis of Polymeric Materials", 2005, Springer, New York, p. 698.
Extended European Search Report in commonly owned European Application No. 09180865.9, dated Apr. 16, 2010.

\* cited by examiner

STYRENE-BASED COPOLYMER AND THERMOPLASTIC RESIN COMPOSITION INCLUDING THE SAME

CROSS-REFERENCE TO RELATED APPLICATIONS

This application claims priority under 35 U.S.C. §119 to Korean Patent Application No. 10-2013-0149586, filed on Dec. 4, 2013, and No. 10-2014-0079092, filed on Jun. 26, 2014, in the Korean Intellectual Property Office, the disclosure of each of which is incorporated herein by reference in its entirety.

FIELD OF THE INVENTION

The present invention relates to a styrene-based copolymer and a thermoplastic resin composition including the same. More specifically, the present invention relates to a styrene-based copolymer capable of implementing a uniform and excellent low gloss property with minimal or no deterioration of physical properties such as impact resistance, heat resistance, and the like, by including a silicone-based compound having two or more unsaturated reactive groups, and a thermoplastic resin composition including the same.

BACKGROUND

Thermoplastic resins have a low specific gravity as compared to a glass or a metal, and excellent mechanical physical properties such as moldability, impact resistance, and the like. Accordingly, plastic products manufactured with thermoplastic resin are rapidly replacing existing glass or metal in electrical and electronic products, automobile components, and the like.

There has been an increased focus on low gloss resins for aesthetic and anti-glare reasons. In addition, there are environmental concerns associated with prior techniques for imparting a loss gloss effect, such as matt painting or covering a pad. Thus, low gloss resins are increasingly used.

A low gloss resin has been produced by adding or modifying a specific rubber-like component. However, the existing method has problems in that a low gloss effect is not sufficient, and impact strength and heat resistance are deteriorated.

As another method, a method of graft polymerizing a monomer such as an ethylene-unsaturated carboxylic acid with a resin was used. In this method, various physical properties are excellent, but heat resistance is rapidly deteriorated.

Korean Patent Laid-Open Publication No. 2009-0029539 discloses a styrene-based resin composition containing a syndiotactic polystyrene resin as a matting agent. The matting agent has a syndiotactic structure, that is, a three-dimensional structure in which a phenyl group or a substituted phenyl group which is a side chain is positioned in an opposite direction with respect to a main chain formed by a carbon-carbon bond. The matting agent has a property having crystallinity, unlike the existing amorphous polystyrene, such that a low gloss property may be implemented. However, there are still problems in that fluidity and molding workability may be deteriorated to bring poor appearance and deteriorate physical properties such as impact resistance, and the like.

U.S. Pat. No. 4,460,742 discloses a low gloss resin composition using a cross-linked copolymer. In this case, a low gloss effect is shown by introduction of rubber particles having a large diameter or a matting agent. However, the low gloss resin composition has problems in that impact strength, and the like, are deteriorated since an excessive amount of matting agent is needed, and a cost for process is increased since a corrosion molding should be used.

SUMMARY

An embodiment of the present invention is directed to providing a styrene-based copolymer capable of having a uniform and excellent low gloss property with minimal or no deterioration of physical properties such as impact resistance, heat resistance, and the like.

Another embodiment of the present invention is directed to providing a thermoplastic resin composition including the styrene-based copolymer.

In exemplary embodiments, the present invention provides a styrene-based copolymer prepared from a mixture including: (A) an aromatic vinyl-based compound, (B) an unsaturated nitrile-based compound, and (C) a silicone-based compound having two or more unsaturated reactive groups.

The silicone-based compound having two or more unsaturated reactive groups (C) may be used in an amount of about 0.1 to about 10 parts by weight based on about 100 parts by weight of a monomer mixture including about 60 to about 80 wt % of the aromatic vinyl-based compound (A) and about 20 to about 40 wt % of the unsaturated nitrile-based compound (B).

The silicone-based compound having two or more unsaturated reactive groups (C) may be used in an amount of about 0.5 to about 5 parts by weight based on about 100 parts by weight of a monomer mixture including about 60 to about 80 wt % of the aromatic vinyl-based compound (A) and about 20 to about 40 wt % of the unsaturated nitrile-based compound (B).

The silicone-based compound having two or more unsaturated reactive groups may be a compound represented by the following Chemical Formula 1, wherein the compound may be used singly or as a mixture including two or more thereof:

[Chemical Formula 1]

wherein, in Chemical Formula 1, l, m and n are the same or different and are each independently an integer of 0 to 100 (provided that l, m and n are not 0 at the same time) and $R_1$ to $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, substituted or unsubstituted $C_3$ to $C_{30}$ cycloalkyl group, a substituted or unsubstituted $C_6$ to $C_{30}$ aryl group, substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, wherein at least two of $R_1$ to $R_8$ may include a polymerizable unsaturated reactive group, and the compound may have a linear or cyclic structure. When the compound has a cyclic structure, $R_1$ to $R_8$ are optionally linked with each other to thereby form a cyclic structure.

When the silicone-based compound having two or more unsaturated reactive groups has the cyclic structure, the silicone-based compound having two or more unsaturated reactive groups may be a compound represented by the following Chemical Formula 2, wherein the compound may be used singly or as a mixture including two or more thereof:

[Chemical Formula 2]

wherein, in Chemical Formula 2, $R_9$ to $R_{14}$ are the same or different and are each independently a substituted or unsubstituted $C_1$ to $C_{20}$ alkyl group, a substituted or unsubstituted $C_2$ to $C_{20}$ alkenyl group, a substituted or unsubstituted $C_6$ to $C_{20}$ aryl group, $R_{15}$ to $R_{17}$ are the same or different and are each independently hydrogen or a substituted or unsubstituted $C_1$ to $C_6$ alkyl group, and is an integer of 1 to 6.

The silicone-based compound having two or more unsaturated reactive groups may be at least any one selected from the group consisting of 1,3,5-trimethyl-1,3,5-trivinyl-cyclotrisiloxane, 7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof.

The silicone-based compound having two or more unsaturated reactive groups may contain a vinyl silane compound represented by the following Chemical Formula 3:

[Chemical Formula 3]

wherein, in Chemical Formula 3, $R_{18}$ is a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group.

The vinyl silane compound may be at least any one selected from the group consisting of divinyl silane, trivinyl silane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, divinyldiphenylchlorosilane, and mixtures thereof.

The silicone-based compound having two or more unsaturated reactive groups may have a weight average molecular weight of about 150 to about 6,000 g/mol.

The styrene-based copolymer may include about 5 to about 100 wt % of an insoluble inclusion, which is measured by a Soxhlet extraction method.

The styrene-based copolymer may have about 0.1 to about 2.0 wt % of a silicone content, which is measured by an X-Ray Fluorescence Analyzer (X-ray Florescence Analysis: XRF).

The styrene-based copolymer may be prepared from a mixture further including a multi-functional vinyl-based compound. Examples of the multi-functional vinyl-based compound can include without limitation divinyl polydimethylsiloxane, vinyl-modified dimethylsiloxane, divinylbenzene, ethyleneglycol, di(meth)acrylate, allyl(meth)acrylate, diallylphthalate, diallylmaleate, triallylisocyanurate, and mixtures thereof.

Examples of the aromatic vinyl-based compound can include without limitation styrene, α-methylstyrene, β-methylstyrene, p-methylstyrene, p-t-butylstyrene, ethylstyrene, vinyl xylene, monochlorostyrene, dichlorostyrene, dibromostyrene, vinylnaphthalene, and mixtures thereof.

Examples of the unsaturated nitrile-based compound can include without limitation acrylonitrile, methacrylonitrile, ethacrylonitrile, phenylacrylonitrile, α-chloroacrylonitrile, fumaronitrile, and mixtures thereof.

The styrene-based copolymer may have a glass transition temperature (Tg) of about 95 to about 115° C.

In another exemplary embodiment, the present invention provides a thermoplastic resin composition including the styrene-based copolymer as described above.

Examples of the thermoplastic resin composition may include without limitation a styrene-acrylonitrile copolymer (SAN) resin composition, a methylmethacrylate-styrene-acrylonitrile copolymer (MSAN) resin composition, an acrylonitrile-butadiene-styrene copolymer (ABS) resin composition, a methylmethacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC) acrylonitrile-styrene-acrylate copolymer (ASA) alloy resin composition, a polymethylmethacrylate (PMMA)/acrylonitrile-butadiene-styrene copolymer (ABS) alloy resin composition, a polymethylmethacrylate (PMMA) methylmethacrylate-acrylonitrile-butadiene-styrene copolymer (MABS) alloy resin composition, a polymethylmethacrylate (PMMA)/acrylonitrile-styrene-acrylate copolymer (ASA) alloy resin composition, and mixtures thereof.

In another exemplary embodiment, the present invention provides a molded product including the thermoplastic resin composition including the styrene-based copolymer as described above.

The molded product may have a gloss of about 20 to about 90%, the gloss measured at an angle of about 60 degrees by an evaluation method defined by ASTM D523.

The molded product may have an absolute value of surface skewness (Rsk) of about 0.001 to about 1, the absolute value of surface skewness (Rsk) measured by an evaluation method defined by JIS B-0601.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a styrene-based copolymer capable of implementing a low gloss property of the present invention is described in detail. The exemplary embodiments to be provided below are provided by way of example so that the idea according to the present invention can be sufficiently transferred to those skilled in the art to which the present invention pertains. As used here, unless technical and scientific terms used herein are defined otherwise, they have meanings understood by those skilled in the art to which the present invention pertains. Known functions and components which obscure the description and the accompanying drawings of the present invention with unnecessary detail will be omitted.

The present inventors studied to develop a styrene-based copolymer capable of implementing excellent low gloss property without deteriorating physical properties such as impact resistance, heat resistance, and the like, and surprisingly found that the styrene-based copolymer prepared from a mixture including an aromatic vinyl-based compound, an unsaturated nitrile-based compound, and a silicone-based compound having two or more unsaturated reactive groups may implement excellent low gloss property with minimal or no deterioration of various physical properties, thereby completing the present invention.

The styrene-based copolymer may be prepared from a mixture including (A) an aromatic vinyl-based compound, (B) an unsaturated nitrile-based compound, and (C) a silicone-based compound having two or more unsaturated reactive groups.

Hereinafter, each component is described in more detail.

(A) Aromatic Vinyl-Based Compound

Examples of the aromatic vinyl-based compound in the present invention may include without limitation styrene, α-methylstyrene, β-methylstyrene, p-methylstyrene, p-t-butylstyrene, ethylstyrene, vinyl xylene, monochlorostyrene, dichlorostyrene, dibromostyrene, vinylnaphthalene, and the like, and mixtures thereof.

In exemplary embodiments, the aromatic vinyl-based compound may include styrene, α-methyl styrene, or a mixture thereof.

The aromatic vinyl-based compound in the present invention may be used in an amount of about 60 to about 80 wt % based on the total weight (100 wt %) of a monomer mixture for preparing the styrene-based copolymer including the aromatic vinyl-based compound and the unsaturated nitrile-based compound. In some embodiments, the monomer mixture may include the aromatic vinyl-based compound in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl-based compound can be in a range from about any of the foregoing amounts to about any other of the foregoing amounts.

In the above-described range, impact strength and heat resistance of the thermoplastic resin composition may be improved.

(B) Unsaturated Nitrile-Based Compound

Examples of the unsaturated nitrile-based compound may include without limitation acrylonitrile, methacrylonitrile, ethacrylonitrile, phenylacrylonitrile, α-chloroacrylonitrile, fumaronitrile, and the like, and mixtures thereof.

In exemplary embodiments, the unsaturated nitrile-based compound may include acrylonitrile.

The unsaturated nitrile-based compound in the present invention may be used in an amount of about 20 to about 40 wt % based on the total weight (100 wt %) of the monomer mixture for preparing the styrene-based copolymer including the aromatic vinyl-based compound and the unsaturated nitrile-based compound. In some embodiments, the monomer mixture may include the unsaturated nitrile-based compound in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of the unsaturated nitrile-based compound can be in a range from about any of the foregoing amounts to about any other of the foregoing amounts.

A weight mixing ratio (aromatic vinyl-based compound: unsaturated nitrile-based compound) between the aromatic vinyl-based compound and the unsaturated nitrile-based compound may be about 7:3 to about 9:1. When the amount of the unsaturated nitrile-based compound satisfies the above-described range, low gloss property may be improved with minimal or no deterioration of mechanical physical property and molding workability of the thermoplastic resin composition, in combination with other components.

(C) Silicone-Based Compound Having Two or More Unsaturated Reactive Groups

The silicone-based compound having two or more unsaturated reactive groups in the present invention may be used to maintain various physical properties such as impact resistance, heat resistance, and the like, and implement excellent low gloss property.

The silicone-based compound having two or more unsaturated reactive groups may be a compound represented by the following Chemical Formula 1, wherein the compound may be included singly or as a mixture including at least two or more thereof:

[Chemical Formula 1]

wherein in Chemical Formula 1, l, m and n are the same or different and are each independently an integer of 0 to 100 (provided that l, m and n are not 0 at the same time) and $R_1$ to $R_8$ are the same or different and are each independently hydrogen, a substituted or unsubstituted $C_1$ to $C_{30}$ alkyl group, substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, wherein at least two of $R_1$ to $R_8$ may include a polymerizable unsaturated reactive group, and the compound may have a linear or cyclic structure. When the compound, has a cyclic structure, $R_1$ to $R_8$ are optionally linked with each other to thereby form a cyclic structure As used herein, unless otherwise defined, the term "substituted" means that one or more hydrogen atoms are substituted with a substituent group such as but not limited to halogen (—F, —Br, —Cl, —I), a hydroxy group, a nitro group, a cyano group, an amino group, a carboxyl group, $C_1$ to $C_{30}$ alkyl, $C_6$ to $C_{30}$ aryl, $C_2$ to $C_{30}$ heteroaryl, and/or $C_1$ to $C_{20}$ alkoxy.

As used herein, the term "hetero" refers to one or more of N, O, S, and/or P atoms, in place of a carbon atom.

In the styrene-based copolymer according to an exemplary embodiment of the present invention, when the silicone-based compound having two or more unsaturated reactive groups has a cyclic structure, the silicone-based compound having two or more unsaturated reactive groups may be represented by the following Chemical Formula 2:

[Chemical Formula 2]

wherein, in Chemical Formula 2, $R_9$ to $R_{14}$ are the same or different and are each independently substituted or unsubstituted $C_1$ to $C_{20}$ alkyl group, a substituted or unsubstituted $C_2$ to $C_{20}$ alkenyl group, a substituted or unsubstituted $C_6$ to $C_{20}$ aryl group, $R_{15}$ to $R_{17}$ are the same or different and are each independently hydrogen, or a substituted or unsubstituted $C_1$ to $C_6$ alkyl group, and p is an integer of 1 to 6.

Examples of the silicone-based compound having two or more unsaturated reactive groups may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri sec-butyl-1,3,5-trivinyl-cyclotrisiloxane, 1,3,5,7-tetra sec-butyl-1,3,5,7-tetravinyl-cyclotetrasiloxane, 1,3,5,7,9-penta sec-butyl-1,3,5,7,9-pentavinyl-cyclopentasiloxane, 1,3,5-triisopropyl-1,3,5-trimethyl-cyclotrisiloxane, 1,3,5,7-tetraisopropyl-1,3,5,7-tetramethyl-cyclotetrasiloxane, 1,3,5,7,9-penta-isopropyl-1,3,5,7,9-pentamethyl-cyclopentasiloxane, 1,3,5-triisopropyl-1,3,5-triethyl-cyclotrisiloxane, 1,3,5,7-tetraisopropyl-1,3,5,7-tetraethyl-cyclotetrasiloxane, 1,3,5,7,9-pentaisopropyl-1,3,5,7,9-pentaethyl-cyclopentasiloxane, 1,1,3,3,5,5-hexaisopropyl-cyclotrisiloxane, 1,1,3,3,5,5,7,7-octaisopropyl-cyclotetrasiloxane, 1,1,3,3,5,5,7,7,9,9-decaisopropyl-cyclopentasiloxane, 1,3,5-tri sec-butyl-1,3,5-trimethyl-cyclotrisiloxane, 1,3,5,7-tetra sec-butyl-1,3,5,7-tetramethyl-cyclotetrasiloxane, 1,3,5,7,9-penta sec-butyl-1,3,5,7,9-pentamethyl-cyclopentasiloxane, 1,3,5-tri sec-butyl-1,3,5-triethyl-cyclotrisiloxane, 1,3,5,7-tetra-sec-butyl-1,3,5,7-tetraethyl-cyclotetrasiloxane, 1,3,5,7,9-penta sec-butyl-1,3,5,7,9-pentaethyl-cyclopentasiloxane, 1,3,5-triisopropyl-cyclotrisiloxane, 1,3,5,7-tetraisopropyl-cyclotetrasiloxane, 1,3,5,7,9-pentaisopropyl-cyclopentasiloxane, 1,3,5-tri sec-butyl-cyclotrisiloxane, 1,3,5,7-tetra sec-butyl-cyclotetrasiloxane, 1,3,5,7,9-penta sec-butyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane and the like, and mixtures thereof. In exemplary embodiments, at least any one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof may be used. For example, 1,3,5,7-tetramethyl-1,3,5,7-tetravinyl-cyclotetrasiloxane may be used.

The silicone-based compound having two or more unsaturated reactive groups may contain a vinyl silane compound represented by the following Chemical Formula 3:

$(R_{18})_2Si(CH=CH_2)_2$     [Chemical Formula 3]

wherein, in Chemical Formula 3, $R_{18}$ is a substituted or unsubstituted $C_1$ to 20 alkyl group, a substituted or unsubstituted $C_2$ to $C_{20}$ alkenyl group, or a substituted or unsubstituted. $C_6$ to $C_{20}$ aryl group.

The vinyl silane compound may be a silicone-based compound having at least two vinyl groups (—CH═CH$_2$) on a silicon atom. Specific examples of the vinyl silane compound may include without limitation divinyl silane, trivinyl silane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, divinyldiphenylchlorosilane, and the like, and mixtures thereof.

The silicone-based compound having two or more unsaturated reactive groups in the present invention may implement various excellent physical properties such as impact resistance, heat resistance, and the like, as well as the low gloss property which is difficult to be achieved with the existing cross-linking agent, singly or in combination with other components. In addition, as compared to the existing cross-linking agent, a degree of cross-linking and a polymerization reaction rate may be easily controlled in the silicone-based compound having two or more unsaturated reactive groups.

The silicone-based compound having two or more unsaturated reactive groups may have a molecular weight or a weight average molecular weight of about 150 to about 6,000 g/mol. When the above-described range is satisfied, the degree of cross-linking may be easily controlled and the cross-linking reaction may be smoothly performed, thereby implementing excellent low gloss property.

The silicone-based compound having two or more unsaturated reactive groups may be used in an amount of about 0.1 to about 10 parts by weight, for example, about 0.1 to about 8 parts by weight, and as another example, about 0.5 to about 5 parts by weight, based on about 100 parts by weight of a monomer mixture including the aromatic vinyl-based compound and the unsaturated nitrile-based compound. In some embodiments, the silicone-based compound having two or more unsaturated reactive groups may be used in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the silicone-based compound having two or more unsaturated reactive groups can be in a range from about any of the foregoing amounts to about any other of the foregoing amounts.

When the above-described range is satisfied, the degree of cross-linking of the styrene-based copolymer may be easily controlled, the low gloss property may be improved with minimal or no deterioration of impact resistance and thermal resistance, and generally uniform low gloss property may be implemented.

The styrene-based copolymer according to the present invention may be prepared from the mixture further including one or more multi-functional vinyl-based compounds. Examples of the multi-functional vinyl-based compound can include without limitation divinyl polydimethylsiloxane, vinyl-modified dimethylsiloxane, divinylbenzene, ethyleneglycol, di(meth)acrylate, allyl(meth)acrylate, diallylphthalate, diallylmaleate, triallylisocyanurate, and the like, and mixtures thereof. In exemplary embodiments, at least any one selected from the group consisting divinyl polydimethylsiloxane, vinyl-modified dimethylsiloxane, and mixtures thereof, may be used.

The multi-functional vinyl-based compound may be used in an amount of about 0.001 to about 10.0 parts by weight, for example, about 0.01 to about 3.0 parts by weight, based on about 100 parts by weight of a monomer mixture including the aromatic vinyl-based compound and the unsaturated nitrile-based compound. In some embodiments, the multi-functional vinyl-based compound may be used in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the multi-functional vinyl-based compound can be in a range from about any of the foregoing amounts to about any other of the foregoing amounts.

In the above-described range, the degree of cross-linking and the polymerization reaction rate of the styrene-based copolymer may be easily controlled, and the low gloss property may be implemented with minimal or no deterioration of impact resistance and thermal resistance in combination with other components.

The styrene-based copolymer according to the present invention may have a glass transition temperature (Tg) of about 95 to about 115° C. In the above-described range, a thermoplastic resin composition including the styrene-based copolymer may implement excellent low gloss property with minimal or no deterioration of impact resistance and heat resistance.

The styrene-based copolymer in the present invention may be prepared by general polymerization methods such as a suspension polymerization, an emulsion polymerization, a solution polymerization, and the like. However, the present invention is not necessarily limited thereto. As an example of a method of preparing the copolymer, a suspension polymerization may be used. At the time of preparing the styrene-based copolymer by the suspension polymerization, dispersibility may be improved by using an inorganic dispersant and/or an organic dispersant. As the organic dispersant, a homopolymer and/or a copolymer of an acrylic acid and/or a methacrylic acid may be used. When used as the organic dispersant, the acrylic acid and/or the methacrylic acid homopolymer and/or copolymer may be present in an amount of about 50 parts by weight or more based on about 100 parts by weight of the copolymer. In addition, the acrylic acid and/or the methacrylic acid may be a sodium salt, a potassium salt, and/or an ammonium salt, in order to maintain an appropriate solubility.

As a polymerization initiator at the time of copolymerization of the styrene-based copolymer, azobisisobutyronitrile may be used. However, the present invention not necessarily limited thereto.

The styrene-based copolymer according to the present invention may have a linear or a cross-linked form. In exemplary embodiments, the styrene-based copolymer according to the present invention may have a cross-linked form.

Here, the cross-linking of the styrene-based copolymer may be confirmed by a content of an insoluble inclusion measured by a Soxhlet extraction method.

In the Soxhlet extraction method, an organic solvent selected from the group consisting of toluene, tetrahydrofuran, ethyl acetate, chloroform, and mixtures thereof, may be used. However, the present invention is not necessarily limited thereto. In exemplary embodiments, tetrahydrofuran (THF) may be used.

Figure 4:
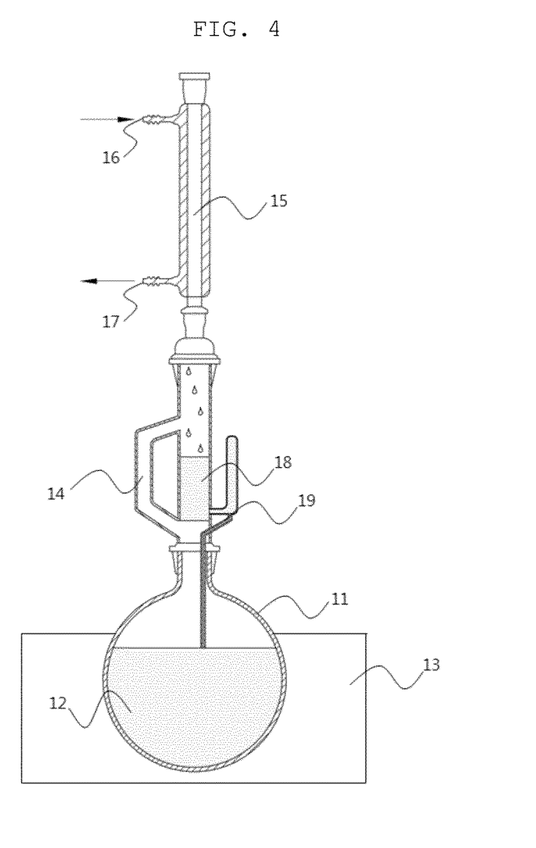
FIG. 4 shows a Soxhlet extractor according to an exemplary embodiment of the present invention.

Specifically, the Soxhlet extraction method may be performed from a mixed solution in which the styrene-based copolymer according to the present invention is mixed with a solvent, by a Soxhlet extractor. FIG. 4 shows a Soxhlet extractor according to an exemplary embodiment of the present invention, wherein tetrahydrofuran 12 contained in a container 11 at the time of extraction is vaporized by a heater 13, the vaporized tetrahydrofuran is allowed to pass through a vaporization line 14, and to be introduced into a cooler 15 (including a coolant inlet 16 and a coolant outlet 17). The tetrahydrofuran cooled in the cooler is liquefied and stored in a storing member included in a cylindrical filter 18. Then, when an amount of the tetrahydrofuran is excessive such that the tetrahydrofuran discharged from the storing member flows to the container 11 through a circulation line 19, the tetrahydrofuran circulating the resin is extracted from the cylindrical filter.

As an exemplary embodiment, the styrene-based copolymer according to the present invention may include about 5 to about 100 wt % of an insoluble inclusion, which is maintained after performing a Soxhlet extraction method for about 48 hours using tetrahydrofuran (THF).

In addition, the styrene-based copolymer according to the present invention may have about 0.1 to about 2.0 wt % of a silicone content, which is measured by an X-Ray Fluorescence Analyzer (X-ray Florescence Analysis: XRF).

Here, an XRF analysis, which is a method of analyzing a wavelength distribution of an x-ray which is conflicted onto a material and secondarily discharged therefrom and estimating the type and component ratio of the constituent elements of materials, is an X-ray florescence spectrometry. For the XRF analysis, general apparatuses may be used. In the present invention, an X-ray Fluorescence Spectrometer (Model: Axios advanced. Maker. PANalytical (Netherland)) was used.

For the analysis method of the silicone by XRF in the present invention, a sample is prepared by using the styrene-based copolymer according to the present invention. In addition, a standard sample for analysis is prepared. The silicone (Si) element contained in the standard sample is measured by X-ray fluorescent analysis (XRF) and a calibration thereof is prepared. Then, the silicone (Si) element in the sample is measured by X-ray fluorescent analysis (XRF), and then the measured values are introduced into the previously set calibration, such that a quantitative analysis is performed.

The styrene-based copolymer according to the present invention may be applied to implement a low gloss property of the thermoplastic resin composition.

Here, examples of the thermoplastic resin composition may include without limitation a styrene-acrylonitrile copolymer (SAN) resin composition, a methylmethacrylate-styrene-acrylonitrile copolymer (MSAN) resin composition, an acrylonitrile-butadiene-styrene copolymer (ABS) resin composition, a methylmethacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethylmethacrylate (PMMA)/acrylonitrile-butadiene-styrene copolymer (ABS) alloy resin composition, a polymethylmethacrylate (PMMA)/methylmethacrylate-acrylonitrile-butadiene-styrene copolymer (MABS) alloy resin composition, a polymethylmethacrylate (PMMA)/acrylonitrile-styrene-acrylate copolymer (ASA) alloy resin composition, and the like, and mixtures thereof.

The thermoplastic resin composition containing the styrene-based copolymer may have excellent low gloss property with minimal or no deterioration of physical properties such as impact resistance, heat resistance, and the like.

The present invention provides a molded product including the thermoplastic resin composition including the styrene-based copolymer. For example, the molded product may be provided by using the thermoplastic resin composition including the styrene-based copolymer in the manufacture of products for use in various industrial fields such as various electrical and electronic products, automobile components, and the like. The molded products can be produced using conventional processes known in the art.

The molded product according to an exemplary embodiment of the present invention may have a gloss of about 20 to about 90%, the gloss measured at an angle of about 60 degrees by an evaluation method defined by ASTM D523.

The molded product according to an exemplary embodiment of the present invention may have an absolute value of surface skewness (Rsk) of about 0.001 to about 1, the absolute value of surface skewness (Rsk) measured by an evaluation method defined by JIS B-0601.

Hereinafter, the following Examples will be provided in order to describe the present invention in more detail. However, the present invention is not limited to these Examples.

Specifications of each component used in the following Examples and Comparative Examples are as follows.

Styrene is used as the aromatic vinyl-based compound (A).

Acrylonitrile is used as the unsaturated nitrile-based compound (B).

1,3,5,7-tetramethyl-1,3,5,7-tetravinyl-cyclotetrasiloxane (SKC Company, density: about 0.98 g/ml (20), Product Name: Vinyl D-4, molecular weight: about 344.7 g/mol) is used as the silicone-based compound having two or more unsaturated reactive groups (C).

Divinyl polydimethylsiloxane (KCC Corporation, Product Name SF3010PDX20, weight average molecular weight: about: 9,000 g/mol) is used as a multi-functional vinyl-based compound (D).

Divinylbenzene (Fluka Corporation, Product Name: DVB, molecular weight: about 130.2 g/mol) is used as a multi-functional vinyl-based compound (E).

Ethylene glycol dimethacrylate (Evonik Corporation, Product Name: EGDMA, molecular weight: about 198.2 g/ml) is used as a multi-functional vinyl-based compound (F).

Pentaerythritol tetraacrylate (Kyoeisha Inc., Product Name: PETTA, molecular weight: about 352.3 g/mol) is used as a multi-functional vinyl-based compound (G).

Example 1

As described in the composition (unit: part by weight) shown in the following Table 1 with the above-mentioned components, about 0.2 parts by weight of t-dodecyl mercaptan (TDM), about 0.2 parts by weight of azobisisobutyronitrile (AIBN), and about 0.5 parts by weight of 1,3,5,7-tetramethyl-1,3,5,7-tetravinyl-cyclotetrasiloxane (C), based on 100 parts by weight of the monomer mixture containing 71 wt % of styrene (A) and 29 wt % of acrylonitrile (B) are put into a reactor, followed by a suspension polymerization, thereby preparing a copolymer. The copolymer is washed, dehydrated, dried at about 80° C. for about 48 hours, and extruded at a barrel temperature of about 250° C. by a twin screw extruder having T-die mounted therein, thereby preparing a sample for evaluating physical properties, having a sheet form with a thickness of about 1 mm. Glass transition temperature, gloss, and surface roughness property are evaluated by the prepared sheet, and results thereof were shown in the following Table 2.

Example 2

Example 2 is conducted by the same method as Example 1 except for using about 1 part by weight of 1,3,5,7-tetramethyl-1,3,5,7-tetravinyl-cyclotetrasiloxane (C).

Example 3

Example 3 is conducted by the same method as Example 1 except for using about 2 parts by weight of 1,3,5,7-tetramethyl-1,3,5,7-tetravinyl-cyclotetrasiloxane (C).

Example 4

Example 4 is conducted by the same method as Example 1 except for using about 2 parts by weight of 1,3,5,7-tetramethyl-1,3,5,7-tetravinyl-cyclotetrasiloxane (C) and further containing about 0.5 parts by weight of divinyl polydimethylsiloxane (D) based on 100 parts by weight of the monomer mixture.

Comparative Example 1

Comparative Example 1 is conducted by the same method as Example 1 except for not using 1,3,5,7-tetramethyl-1,3,5,7-tetravinyl-cyclotetrasiloxane (C).

Comparative Example 2

Comparative Example 2 is conducted by the same method as Example 1 except for using about 0.5 parts by weight of divinyl polydimethylsiloxane (D) instead of using about 0.5 part by weight of 1,3,5,7-tetramethyl-1,3,5,7-tetravinyl-cyclotetrasiloxane (C).

Comparative Example 3

Comparative Example 3 is conducted by the same method as Example 1 except for using about 0.5 parts by weight of divinylbenzene (E) instead of using about 0.5 part by weight of 1,3,5,7-tetramethyl-1,3,5,7-tetravinyl-cyclotetrasiloxane (C).

Comparative Example 4

Comparative Example 4 is conducted by the same method as Example 1 except for using about 0.5 parts by weight of ethylene glycol dimethacrylate instead of using about 0.5 part by weight of 1,3,5,7-tetramethyl-1,3,5,7-tetravinyl-cyclotetrasiloxane (C).

Comparative Example 5

Comparative Example 5 is conducted by the same method as Example 1 except for using about 0.5 parts by weight of pentaerythritol tetraacrylate (G) instead of using about 0.5 part by weight of 1,3,5,7-tetramethyl-1,3,5,7-tetravinyl-cyclotetrasiloxane (C).

(Analysis by Soxhlet Extraction)

The copolymer prepared by Example 1 is extracted with toluene by a Soxhlet extractor for about 48 hours, and components contained in the extracted copolymer are analyzed by gas chromatography (hereinafter, GPC) and a nuclear magnetic resonance spectrometer (NMR), and as a result, it is confirmed that an inclusion soluble in toluene has a content of about 15.4 wt %, and an insoluble inclusion has a content of about 84.6 wt %. The insoluble inclusion is extracted with tetrahydrofuran (THF) again for about 48 hours, and components contained in the extracted copolymer are analyzed by GPC and NMR, and as a result, it is confirmed that about 84.6 wt % of the insoluble inclusion in THF has a content of about 41.5 wt %, and an insoluble inclusion has a content of about 43.1 wt %. Accordingly, it could be confirmed that the copolymer prepared by Example 1 is a partially cross-linked component.

Example 5

About 0.1 parts by weight of a hindered phenol-based heat stabilizer (BASF Corporation, Product Name: IRGANOX 1010) is added to 100 parts by weight of a base resin containing: about 20 parts by weight of the styrene-based copolymer according to Example 1; about 55 parts by weight of a styrene-acrylonitrile copolymer (SAN) resin (Cheil Industries Inc.) containing about 28.5 wt % of acrylonitrile and having a weight average molecular weight of about 125,000 g/mol; about 25 parts by weight of an acrylonitrile-butadiene-styrene graft copolymer (g-ABS) resin (Cheil Industries, Inc.) containing about 58 wt % of a rubber-like copolymer and having an average particle diameter of about 260 nm, followed by melting, mixing, and extruding processes, thereby preparing a pellet.

Here, the extruding process is performed at a barrel temperature of about 250° C. by a twin screw extruder satisfying L/D of about 29, diameter of about 45 mm, and the prepared pellet is dried at about 80° C. for about 2 hours and injection-molded at a cylinder temperature of about 230° C. in a 6 oz injection molding machine, thereby preparing a sample for evaluating physical properties. Izod impact strength, a Vicat softening point, gloss, and surface skewness of the prepared sample are measured. The measuring method thereof is as follows, and results thereof are shown in the following Table 3.

Example 6

Example 6 is conducted by the same method as Example 5 except for using the styrene-based copolymer according to Example 2 instead of using the styrene-based copolymer according to Example 1.

Example 7

Example 7 is conducted by the same method as Example 5 except for using the styrene-based copolymer according to Example 3 instead of using the styrene-based copolymer according to Example 1.

Example 8

Example 8 is conducted by the same method as Example 5 except for using the styrene-based copolymer according to Example 4 instead of using the styrene-based copolymer according to Example 1.

Comparative Example 6

Comparative Example 6 is conducted by the same method as Example 5 except for using the styrene-based copolymer according to Comparative Example 1 instead of using the styrene-based copolymer according to Example 1.

Comparative Example 7

Comparative Example 7 is conducted by the same method as Example 5 except for using the styrene-based copolymer according to Comparative Example 2 instead of using the styrene-based copolymer according to Example 1.

Comparative Example 8

Comparative Example 8 is conducted by the same method as Example 5 except for using the styrene-based copolymer according to Comparative Example 3 instead of using the styrene-based copolymer according to Example 1.

Comparative Example 9

Comparative Example 9 is conducted by the same method as Example 5 except for using the styrene-based copolymer according to Comparative Example 4 instead of using the styrene-based copolymer according to Example 1.

Comparative Example 10

Comparative Example 10 is conducted by the same method as Example 5 except for using the styrene-based copolymer according to Comparative Example 5 instead of using the styrene-based copolymer according to Example 1.

Comparative Example 11

Comparative Example 11 is conducted by the same method as Example 5 except for using 5 parts by weight of a matting agent (Galata Chemicals, Product Name: BLENDEX BMAT) based on 100 parts by weight of a base resin further containing the styrene-acrylonitrile copolymer (SAN) resin (Cheil Industries Inc.) containing about 28.5 wt % of acrylonitrile and having a weight average molecular weight of about 125,000 g/mol instead of about 20 parts by weight of the styrene-based copolymer according to Example 1.

Comparative Example 12

Comparative Example 12 is conducted by the same method as Example 5 except that an average particle diameter of a dispersed phase as a base resin is about 10 μm, and based on 100 parts by weight of the total base resin, a content of the rubber-like polymer contained in the dispersed phase is about 14 wt %, a content of the acrylonitrile of the SAN resin having a continuous phase is about 5 wt %, and the ABS resin (Cheil Industries Inc.) having an weight average molecular weight of about 150,000 g/mol and prepared by a bulk polymerization method is used.

(Evaluation)
(1) Glass Transition Temperature (Tg)
A temperature is increased up to 160° C. at a rate of 20° C./mins by a Q2910 manufactured by TA Instrument, then slowly decreased and maintained an equivalent state at 50° C., and the temperature is increased again up to 160° C. at a rate of 10° C./mins. An inflection point of the endothermic transition curve is determined as a glass transition temperature.

(2) Gloss (Surface Gloss)

Surface gloss is measured at an angle of about 60 degrees by an evaluation method defined by ASTM D523, using a BYK-Gardner Gloss Meter manufactured by BYK Company.

(3) Surface Roughness (Ra)

Surface roughness is measured by an evaluation method defined by JIS B-0601, using a laser microscope for measuring a shape, VK-X200, manufactured by KEYENCE Company.

(4) Surface Skewness (Rsk)

Surface skewness is measured by an evaluation method defined by JIS B-0601, using a laser microscope for measuring a shape, VK-X200, manufactured by KEYENCE Company. As an absolute value of the surface skewness (Rsk) is close to 0, it means that a surface is smooth.

(5) Izod Impact Strength

Izod impact strength is measured on a sample having a thickness of ⅛" by an evaluation method defined by ASTM D256, under a notched condition.

(6) Vicat Softening Point

Vicat softening point is measured on a sample having a thickness of ¼" by an evaluation method defined by ISO 306 B50.

TABLE 1

| Classification | (A) | (B) | (C) | (D) | (E) | (F) | (G) |
|---|---|---|---|---|---|---|---|
| Example 1 | 71 | 29 | 0.5 | — | — | — | — |
| Example 2 | 71 | 29 | 1 | — | — | — | — |
| Example 3 | 71 | 29 | 2 | — | — | — | — |
| Example 4 | 71 | 29 | 2 | 0.5 | — | — | — |
| Comparative Example 1 | 71 | 29 | — | — | — | — | — |
| Comparative Example 2 | 71 | 29 | — | 0.5 | — | — | — |
| Comparative Example 3 | 71 | 29 | — | — | 0.5 | — | — |
| Comparative Example 4 | 71 | 29 | — | — | — | 0.5 | — |
| Comparative Example 5 | 71 | 29 | — | — | — | — | 0.5 |

TABLE 2

| Classification | Gloss (%) | Surface Roughness (Ra, μm) | Glass Transition Temperature (° C.) |
|---|---|---|---|
| Example 1 | 43.5 | 0.623 | 109.8 |
| Example 2 | 16.2 | 0.913 | 109.3 |
| Example 3 | 14.5 | 1.102 | 108.4 |
| Example 4 | 10.5 | 1.118 | 109.2 |
| Comparative Example 1 | 90.0 | 0.114 | 110.4 |
| Comparative Example 2 | 78.0 | 0.134 | 109.5 |
| Comparative Example 3 | 31.2 | 0.752 | 110.8 |
| Comparative Example 4 | 33.2 | 0.740 | 105.2 |
| Comparative Example 5 | 37.6 | 0.602 | 106.4 |

TABLE 3

| Classification | Izod Impact Strength (kgf·cm/cm) | Vicat Softening Point (° C.) | Gloss (%) | Surface Skewness (Rsk) |
|---|---|---|---|---|
| Example 5 | 23.6 | 101.6 | 81 | −0.0028 |
| Example 6 | 23.0 | 101.6 | 75 | −0.0041 |
| Example 7 | 20.5 | 101.5 | 35 | −0.0842 |
| Example 8 | 21.7 | 101.1 | 32 | −0.3052 |
| Comparative Example 6 | 25.2 | 100.9 | 95 | −0.0011 |
| Comparative Example 7 | 22.9 | 100.5 | 90 | −0.0102 |
| Comparative Example 8 | 21.7 | 101.8 | 88 | −0.0448 |
| Comparative Example 9 | 16.0 | 97.3 | 71 | −1.5774 |
| Comparative Example 10 | 16.0 | 97.7 | 75 | −1.0764 |
| Comparative Example 11 | 17.5 | 97.4 | 30 | −0.6260 |
| Comparative Example 12 | 8.0 | 97.0 | 31 | 0.2838 |

It can be seen from Table 2 that the styrene-based copolymer according to Examples 1 to 4 of the present invention have high surface roughness after the molding process to implement excellent low gloss property. Meanwhile, it can be seen that Comparative Example 1 not using the silicone-based compound having two or more unsaturated reactive groups (C) according to the present invention and Comparative Example 2 using the divinyl polydimethylsiloxane (D) alone did not implement sufficient low gloss property. In addition, it can be seen that Comparative Examples 3 to 5 using the divinylbenzene (E), the ethylene glycol dimethacrylate (F), and the pentaerythritol tetraacrylate (G), all of which are existing multi-functional vinyl-based compounds, respectively, exhibit excellent low gloss property.

Figure 1:
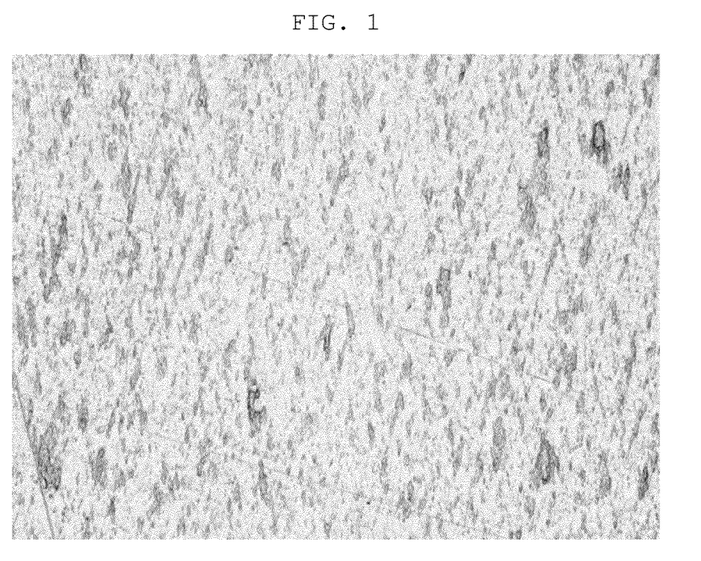
FIG. 1 is a photograph magnified by 20 times of a surface of a molded product sample according to Example 7 taken by a laser microscope VK-X200 for measuring a shape, manufactured by KEYENCE Corporation.
Figure 2:
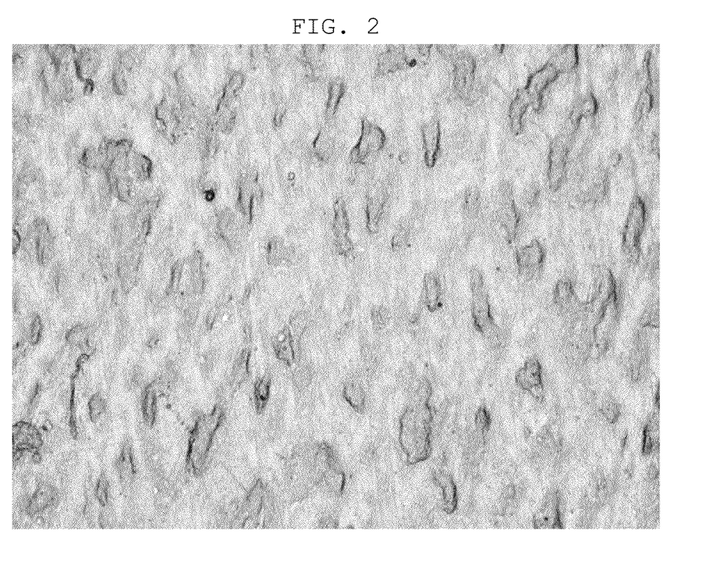
FIG. 2 is a photograph magnified by 20 times of a surface of a molded product sample according to Comparative Example 13 taken by the same laser microscope as FIG. 1.
Figure 3:
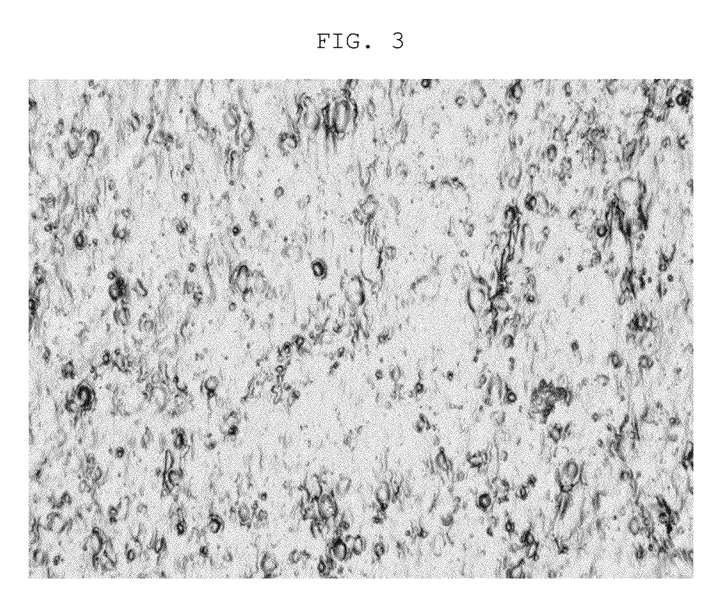
FIG. 3 is a photograph magnified by 20 times of a surface of a molded product sample according to Comparative Example 14 taken by the same laser microscope as FIG. 1.

Meanwhile, it can be seen from Table 3 and FIG. 1 that the thermoplastic resin compositions of Examples 5 to 8 to which the styrene-based copolymers of Examples 1 to 4 are applied, respectively, have an entirely smooth surface and excellent low gloss property without significantly deteriorating impact resistance and heat resistance as compared to the thermoplastic resin composition of Comparative Example 6. Meanwhile, the thermoplastic resin compositions of Comparative Examples 6 to 12 have poor impact resistance, heat resistance, or low gloss property. In particular, it can be seen that in Comparative Example 11 using the existing matting agent, gloss is low, but as shown in the Rsk value and FIG. 2, the surface thereof is not smooth, such that overall uniform low gloss property is not shown, and impact resistance and heat resistance are deteriorated, and in Comparative Example using the rubber-like polymer having a large diameter to implement low gloss property, the impact resistance is remarkably deteriorated, and as shown in FIG. 3, the surface is not smooth.

The styrene-based copolymer according to the present invention may implement uniform and excellent low gloss property with minimal or no deterioration of physical properties such as impact resistance, heat resistance, and the like.

In addition, a thermoplastic resin composition that can have excellent impact resistance, heat resistance, and a uniform low gloss property by including the styrene-based copolymer may be provided.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirit of the invention.

What is claimed is:

1. A styrene-based copolymer prepared from a mixture comprising:
   (A) an aromatic vinyl-based compound,
   (B) an unsaturated nitrile-based compound, and
   (C) an organosilicon compound having two or more unsaturated reactive groups,
   wherein the organosilicon-based compound having two or more unsaturated reactive groups (C) is represented by the following Chemical Formula 2:

[Chemical Formula 2]

wherein, in Chemical Formula 2,
$R_9$ to $R_{14}$ are the same or different and are each independently hydrogen, a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group,
$R_{15}$ to $R_{17}$ are the same or different and are each independently hydrogen or a substituted or unsubstituted $C_1$ to $C_6$ alkyl group, and
p is an integer of 1 to 6,
wherein the organosilicon compound having two or more unsaturated reactive groups (C) further includes a vinyl silane compound represented by the following Chemical Formula 3:

$(R_{18})_2Si(CH=CH_2)_2$     [Chemical Formula 3]

wherein, in Chemical Formula 3, $R_{18}$ is hydrogen, a substituted or unsubstituted C1 to C20 alkyl group, a substituted or unsubstituted C2 to C20 alkenyl group, or a substituted or unsubstituted C6 to C20 aryl group.

2. The styrene-based copolymer of claim 1, wherein the organosilicon compound having two or more unsaturated reactive groups (C) is used in an amount of about 0.1 to about 10 parts by weight based on about 100 parts by weight of a monomer mixture including about 60 to about 80 wt % of the aromatic vinyl-based compound (A) and about 20 to about 40 wt % of the unsaturated nitrile-based compound (B).

3. The styrene-based copolymer of claim 2, wherein the organosilicon compound having two or more unsaturated reactive groups (C) is used in an amount of about 0.5 to about 5 parts by weight.

4. The styrene-based copolymer of claim 1, wherein the organosilicon compound having two or more unsaturated reactive groups (C) comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof.

5. The styrene-based copolymer of claim 1, wherein the vinyl silane compound comprises divinyl silane, trivinyl silane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, divinyldiphenylchlorosilane, or a mixture thereof.

6. The styrene-based copolymer of claim 1, wherein the organosilicon compound having two or more unsaturated reactive groups (C) has a weight average molecular weight of about 150 to about 6,000 g/mol.

7. The styrene-based copolymer of claim 1, wherein the styrene-based copolymer includes about 5 to about 100 wt % of an insoluble inclusion, which is measured by a Soxhlet extraction method.

8. The styrene-based copolymer of claim 1, wherein the styrene-based copolymer has about 0.1 to about 2.0 wt % of a silicone content, which is measured by an X-Ray Fluorescence Analyzer (X-ray Florescence Analysis: XRF).

9. The styrene-based copolymer of claim 1, wherein the mixture further comprises a multi-functional vinyl-based compound selected from the group consisting of divinyl polydimethylsiloxane, vinyl-modified dimethylsiloxane, divinylbenzene, ethyleneglycol, di(meth)acrylate, allyl(meth)acrylate, diallylphthalate, diallylmaleate, triallylisocyanurate, and mixtures thereof.

10. The styrene-based copolymer of claim 1, wherein the aromatic vinyl-based compound comprises styrene, α-methylstyrene, β-methylstyrene, p-methylstyrene, p-t-butylstyrene, ethylstyrene, vinyl xylene, monochlorostyrene, dichlorostyrene, dibromostyrene, vinylnaphthalene, or a mixture thereof.

11. The styrene-based copolymer of claim 1, wherein the unsaturated nitrile-based compound comprises acrylonitrile, methacrylonitrile, ethacrylonitrile, phenylacrylonitrile, α-chloroacrylonitrile, fumaronitrile, or a mixture thereof.

12. The styrene-based copolymer of claim 1, wherein the styrene-based copolymer has a glass transition temperature (Tg) of about 95 to about 115° C.

13. A thermoplastic resin composition comprising the styrene-based copolymer according to claim 1.

14. The thermoplastic resin composition of claim 13, wherein thermoplastic resin composition is a styrene-acrylonitrile copolymer (SAN) resin composition, a methylmethacrylate-styrene-acrylonitrile copolymer (MSAN) resin composition, an acrylonitrile-butadiene-styrene copolymer (ABS) resin composition, a methylmethacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethylmethacrylate (PMMA)/acrylonitrile-butadiene-styrene copolymer (ABS) alloy resin composition, a polymethylmethacrylate (PMMA)/methylmethacrylate-acrylonitrile-butadiene-styrene copolymer (MABS) alloy resin composition, a polymethylmethacrylate (PMMA)/acrylonitrile-styrene-acrylate copolymer (ASA) alloy resin composition, or a mixture thereof.

15. A molded product comprising the thermoplastic resin composition of claim 13.

16. The molded product of claim 15, having a gloss of about 20 to about 90%, the gloss measured at an angle of about 60 degrees by an evaluation method defined by ASTM D523.

17. The molded product of claim 15, having an absolute value of surface skewness (Rsk) of about 0.001 to about 1, the absolute value of surface skewness (Rsk) measured by an evaluation method defined by JIS B-0601.

18. The styrene-based copolymer of claim 1, wherein the styrene-based copolymer has a gloss of 10.5 to 43.5%, the gloss measured at an angle of about 60 degrees by an evaluation method defined by ASTM D523.

* * * * *